United States Patent
Park et al.

(10) Patent No.: US 10,001,859 B2
(45) Date of Patent: Jun. 19, 2018

(54) TOUCH-INTEGRATED DISPLAY PANEL AND DISPLAY DEVICE HAVING THE SAME

(71) Applicant: LG Display Co., Ltd., Seoul (KR)

(72) Inventors: SunJa Park, Chilgok-gun (KR);
Dongmin Seo, Chilgok-gun (KR);
Inseop Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 160 days.

(21) Appl. No.: 15/254,924

(22) Filed: Sep. 1, 2016

(65) Prior Publication Data
US 2017/0192610 A1    Jul. 6, 2017

(30) Foreign Application Priority Data
Dec. 30, 2015 (KR) .................. 10-2015-0189189

(51) Int. Cl.
G06F 3/041 (2006.01)
G06F 3/044 (2006.01)
G02F 1/1333 (2006.01)
G02F 1/1362 (2006.01)
(Continued)

(52) U.S. Cl.
CPC ........ G06F 3/0412 (2013.01); G02F 1/13338 (2013.01); G02F 1/134309 (2013.01); G02F 1/136286 (2013.01); G06F 3/044 (2013.01); G06F 3/0418 (2013.01); G02F 1/1368 (2013.01); G02F 1/13439 (2013.01); G02F 2001/136218 (2013.01); G02F 2001/136295 (2013.01); G02F 2201/121 (2013.01);
(Continued)

(58) Field of Classification Search
CPC ....... G06F 3/044; G06F 3/0412; G06F 3/0416
See application file for complete search history.

(56) References Cited

U.S. PATENT DOCUMENTS 7,675,588 B2 * 3/2010 Ko .................... G02F 1/133512
349/106
9,400,583 B2 * 7/2016 Reynolds ............. G06F 3/0412
(Continued)

FOREIGN PATENT DOCUMENTS

JP   2013-088932 A   5/2013
JP   2014-053000 A   3/2014
(Continued)

OTHER PUBLICATIONS

Office Action dated Oct. 31, 2017 issued in a corresponding Japanese patent application JP 2016-249007.
(Continued)

*Primary Examiner* — Patrick F Marinelli
(74) *Attorney, Agent, or Firm* — Polsinelli PC

(57) ABSTRACT

A touch-integrated display panel includes a substrate, a plurality of first and second pixels, a touch electrode, and a shield electrode. The substrate has an active area and a non-active area outside of the active area. The plurality of first pixels are disposed in the active area, and the plurality of second pixels are disposed in the non-active area. The touch electrode is formed by electrically connecting the common voltage electrodes of a group of first pixels among the plurality of first pixels. The shield electrode is formed by electrically connecting the common voltage electrodes of the plurality of second pixels. The shield electrode is disposed to surround the active area.

14 Claims, 8 Drawing Sheets

(51) Int. Cl.
*G02F 1/1343* (2006.01)
*G02F 1/1368* (2006.01)

(52) U.S. Cl.
CPC .................. *G02F 2201/123* (2013.01); *G06F 2203/04107* (2013.01)

(56) References Cited

U.S. PATENT DOCUMENTS

| | | | | |
|---|---|---|---|---|
| 2008/0123029 A1* | 5/2008 | Ko | .................... | G02F 1/133512 349/96 |
| 2011/0316803 A1* | 12/2011 | Kim | ........................ | G06F 3/044 345/173 |
| 2014/0028582 A1* | 1/2014 | Choi | ........................ | G06F 3/041 345/173 |
| 2014/0184951 A1* | 7/2014 | Yeh | ........................ | G06F 3/044 349/12 |
| 2014/0198066 A1 | 7/2014 | Yoshida | | |
| 2015/0002458 A1* | 1/2015 | Lee | ........................ | G06F 3/045 345/174 |
| 2015/0009634 A1 | 1/2015 | Hsu | | |
| 2015/0084912 A1 | 3/2015 | Seo et al. | | |
| 2015/0286320 A1* | 10/2015 | Reynolds | ............... | G06F 3/0412 345/174 |
| 2015/0309634 A1 | 10/2015 | Lee et al. | | |
| 2016/0091764 A1* | 3/2016 | Asozu | ............... | G02F 1/134309 349/42 |
| 2017/0139291 A1* | 5/2017 | Asozu | ............... | G02F 1/134363 |
| 2017/0192610 A1* | 7/2017 | Park | .................. | G02F 1/136286 |
| 2017/0205676 A1* | 7/2017 | Li | ..................... | G02F 1/136286 |

FOREIGN PATENT DOCUMENTS

| | | |
|---|---|---|
| JP | 2014-137634 A | 7/2014 |
| JP | 2015-064854 A | 4/2015 |
| JP | 2015-215780 A | 12/2015 |

OTHER PUBLICATIONS

European Search Report issued in European Patent Application No. EP 16 20 4009 dated May 29, 2017.

* cited by examiner

TOUCH-INTEGRATED DISPLAY PANEL AND DISPLAY DEVICE HAVING THE SAME

CROSS REFERENCE TO RELATED APPLICATION

This application claims priority from Korean Patent Application Number 10-2015-0189189 filed in the Republic of Korea on Dec. 30, 2015, which is hereby incorporated by reference in its entirety.

BACKGROUND

Field of the Disclosure

The present disclosure relates to a display device, and more particularly, to a touch-integrated display panel having touch electrodes disposed therein. Although the present disclosure is suitable for a wide scope of applications, it is particularly suitable for reducing or eliminating noise generated from a touch electrode of the display panel.

Description of the Background

In response to the development of the information society, there has been increasing demand for various types of display devices able to display images. Currently, a range of display devices, such as liquid crystal display (LCD) devices, plasma display panels (PDPs), and organic light-emitting diode (OLED) display devices, are in use.

Among such display devices, an LCD device includes an array substrate including transistors, an upper substrate including color filters and/or a black matrix, and a liquid crystal molecule array sandwiched between the array substrate and the upper substrate. In the LCD device, the orientation of liquid crystal molecules in the liquid crystal layer is controlled depending on an electric field applied between both electrodes in each pixel, whereby the light transmittance of the liquid crystal layer is adjusted so that an image is displayed.

A display panel of such an LCD device is divided into an active area and a non-active area outside of the active area. The display panel is formed by attaching a first substrate and a second substrate to each other. The first substrate is often referred to as an array substrate, a substrate on which transistors or the like are formed and pixels are defined, while the second substrate is also referred to as an upper substrate, a substrate on which a black matrix and/or a color filter layer are disposed.

The array substrate or the first substrate on which transistors are formed includes a plurality of gate lines extending in a first direction, a plurality of data lines extending in a second direction perpendicular to the first direction, and a plurality of pixels respectively defined by each of the plurality of gate lines and each of the plurality of data lines. At least one transistor is formed in each of the pixels, in which a gate electrode and a source electrode of each transistor are connected to a corresponding gate line and a corresponding data line, respectively.

In addition, a gate driver circuit and a data driver circuit are disposed on a non-active area or are disposed outside of the display panel to provide the gate lines and the data lines with scanning signals or data voltages required for driving the pixels.

Recently, display panels generally include a function of detecting a touch input using a stylus or a user's finger. Display panel types in which a separately-fabricated touchscreen is disposed on a display panel, touch-integrated display panels in which touch sensing electrodes and so on are included within the display panel during the fabrication of the display panel, and so on have been developed.

In a touch-integrated display panel, among such display panels, common voltage electrodes supplying a common voltage Vcom to pixels of the display panel can be generally machined to have a specific shape to be used as touch electrodes.

Since touch electrodes are not required to be more densely distributed than pixels, each touch electrode may be disposed across a group of pixels. When touch electrodes are implemented using the common voltage electrodes, a group of common voltage electrodes, respectively corresponding to each of the pixels, may be combined together to form a single touch electrode.

A touch made to a touch electrode using an external object can be detected in response to a change in capacitance formed in the touch electrode. In general, an external object touching a touch electrode causes an increase in capacitance between the touch electrode and the external object. A display device can determine whether or not a touch has been made by the external object by detecting the increase in capacitance. A method of detecting a touch based on a change in capacitance formed on a touch electrode is also referred to as capacitive touch sensing.

A display device using capacitive touch sensing detects a touch by inputting touch driving signals to touch electrodes and receiving signals in response to the touch driving signals.

When noise is introduced to touch electrodes, response signals may be distorted, and thus a display device may erroneously detect a touch upon receiving such distorted response signals.

SUMMARY

Various aspects of the present disclosure are intended to overcome the problem in which a touch-integrated display device erroneously detects a touch. The present disclosure is also intended to reduce or prevent the introduction of noise to touch electrodes.

According to an aspect of the present disclosure, a touch-integrated display panel may include: a substrate, a plurality of first and second pixels, a touch electrode, and a shield electrode. The substrate has an active area and a non-active area outside of the active area. The plurality of first pixels are disposed in the active area, and the plurality of second pixels are disposed in the non-active area. The touch electrode is formed by electrically connecting the common voltage electrodes of a group of first pixels among the plurality of first pixels. The shield electrode is formed by electrically connecting the common voltage electrodes of the plurality of second pixels. The shield electrode is disposed to surround the active area.

According to another aspect of the present disclosure, a touch-integrated display device may include a display panel and a touch driving circuit. The display panel includes a plurality of first pixels disposed in an active area, a plurality of second pixels disposed in a non-active area, a touch electrode formed by electrically connecting common voltage electrodes of a group of first pixels among the plurality of first pixels, and a shield electrode formed by electrically connecting common voltage electrodes of the plurality of second pixels, the shield electrode being disposed to surround the active area.

According to the present disclosure as set forth above, it is possible to overcome the problem in which the touch-integrated display device erroneously detects a touch. In addition, it is possible to reduce or prevent the introduction of noise to touch electrodes.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Figure 1:
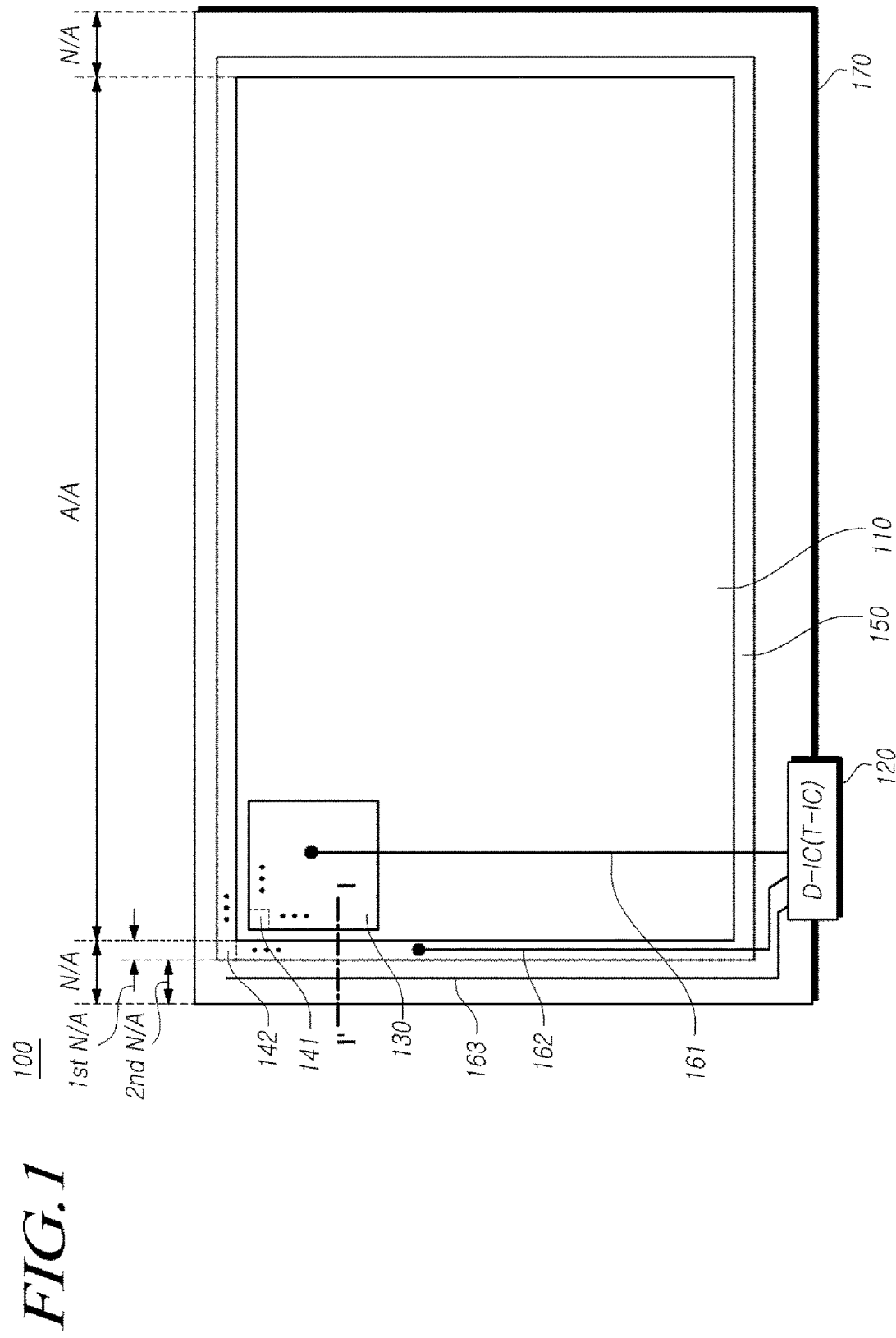
FIG. 1 is a schematic configuration view illustrating a display device according to an exemplary embodiment.

Hereinafter, reference will be made to embodiments of the present disclosure in detail, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 is a schematic configuration view illustrating a display device according to an exemplary embodiment.

Referring to FIG. 1, the display device 100 includes a display panel 110, a driving circuit 120, and so on.

The display panel 110 may be formed by attaching a first substrate functioning as an array substrate and a second substrate functioning as an upper substrate, on which a black matrix and/or a color filter layer are disposed, to each other.

A plurality of gate lines and a plurality of data lines are disposed on the display panel 110, with pixels being defined by the gate lines and the data lines intersecting each other.

In the pixels, thin-film transistors (TFTs) are formed in locations in which the gate lines intersect the data lines. In addition, pixel electrodes to which data voltages are supplied through the TFTs and common voltage electrodes forming magnetic fields in a liquid crystal material based on differences in potential with respect to the pixel electrodes are disposed in the pixels.

The common voltage electrodes operate in a display mode or a touch driving mode.

In the display mode, a common voltage Vcom is supplied to the common voltage electrodes. The common voltage provides an electric field to a liquid crystal layer while forming potential differences with respect to the data voltages formed on the pixel electrodes.

In the touch driving mode, the common voltage electrodes are used as the touch electrodes. In the touch driving mode, touch driving signals are supplied to the common voltage electrodes, and the display device 100 can detect a touch using signals in response to the touch driving signals.

The area of an external object touching the display device 100 is greater than the area of each pixel. A group of common voltage electrodes disposed in a group of pixels may be electrically connected to each other, thereby forming a signal touch electrode 130.

As illustrated in FIG. 1, the display panel 110 is divided into an active area AA in the central portion and a non-active area N/A outside of the active area AA. A plurality of touch electrodes 130 are disposed in the active area AA.

The plurality of touch electrodes 130 are connected to the driving circuit 120 through first driving lines 161 (for the purpose of brevity, only a single first driving line 161 is illustrated). The driving circuit 120 is disposed on a portion of the display panel 110 (on a lower portion of the display panel 110 in FIG. 1).

The driving circuit 120 detects a touch made to each of the plurality of touch electrodes 130 by supplying touch driving signals to the touch electrodes 130 and receiving signals in response to the touch driving signals from the touch electrodes 130.

In addition, the driving circuit 120 supplies data voltages to the pixels. A group of pixels are disposed at an area in which each of the touch electrodes is positioned, and each of the pixels receives a data voltage supplied from the driving circuit 120.

Considering that the driving circuit 120 detects a touch, the driving circuit 120 may be referred to as a touch driving circuit. The driving circuit 120 may also be referred to as a data driving circuit because the driving circuit 120 supplies data voltages to the pixels.

As illustrated in FIG. 1, the touch driving circuit and the data driving circuit may be formed as a single IC. In other embodiments, the touch driving circuit and the data driving circuit may be formed as separate ICs.

The driving circuit 120 is a D-IC or a T-IC disposed within a chop-on-film (COF) in the shape of a flexible printed circuit board (FPCB), and is connected to the display panel 110 via bonding elements.

The non-active area N/A is positioned outside of the active area A/A. The non-active area N/A is divided into a first non-active area $1^{st}$ N/A in which dummy pixels 142 are positioned and a second non-active area $2^{nd}$ N/A in which the dummy pixels 142 are not positioned.

To discriminate pixels positioned in the active area to provide images to a user from the pixels positioned in the non-active area without being visually recognized by the user, hereinafter, pixels positioned in the active area will be referred to as first pixels 141 positioned in the active area and second pixels 142 positioned in the non-active area.

Both the first pixels 141 and the second pixels 142 have pixel electrodes and common voltage electrodes.

The common voltage electrodes included in a group of first pixels may be electrically connected to each other, thereby forming a single touch electrode 130.

The common voltage electrodes included in the second pixels may be electrically connected to each other, thereby forming a shield electrode 150. The shield electrode 150 is connected to the driving circuit 120 through a second driving line 162.

A third driving line 163 electrically connected to the driving circuit 120 is disposed in the second non-active area $2^{nd}$ N/A positioned outside of the second pixels 142.

Figure 2:
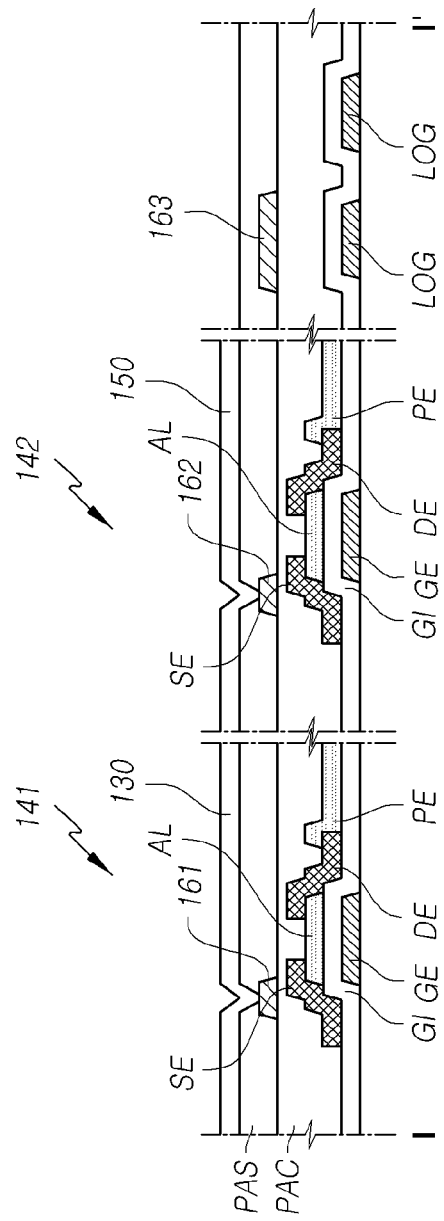
FIG. 2 is a cross-sectional view taken along line I-I' in FIG. 1.

FIG. 2 is a cross-sectional view taken along line I-I' in FIG. 1.

Referring to FIG. 2, in the first pixels 141 positioned in the active area A/A and the second pixels 142 positioned in the first non-active area $1^{st}$ N/A, TFTs are disposed on a substrate. In the second non-active area $2^{nd}$ N/A, line-on-glass lines LOG are disposed on the substrate.

Each of the TFTs may include a gate electrode GE, an active layer AL, a source electrode SE, a drain electrode DE, and so on.

The gate electrodes GE extend from the gate lines.

The active layers AL form active areas of the TFTs. The active layers AL may be formed of an oxide semiconductor such as zinc oxide (ZnO), indium gallium zinc oxide (IGZO), zinc tin oxide (ZTO), and zinc indium oxide (ZIO).

The source electrodes SE extend from the data lines, while the drain electrodes DE are connected to pixel electrodes PE.

Referring to laminated positions, the gate electrodes GE and the line-on-glass lines LOG are formed on the substrate, and a gate insulating layer GI is formed on the gate electrodes GE and the line-on-glass lines LOG In addition, the source electrodes SE, the active layers AL, the drain electrode DE, and the pixel electrodes PE are formed on the gate insulating layer GI.

The gate insulating layer GI on which the TFTs and the pixel electrodes PE are formed is covered with an organic protective layer PAC functioning as both an interlayer insulating layer and a protective layer.

The organic protective layer PAC may be formed of one of photo-acryl, acrylate, polyamide, benzocyclobutene (BCB), and so on.

Driving lines 161, 162, and 163 are disposed on the organic protective layer PAC. The driving lines 161, 162, and 163 are formed of different materials and on different layers from the data lines. Specifically, the first driving line 161, the second driving line 162, and the third driving line 163 may be formed of the same material and on the same layer on the organic protective layer PAC.

The driving lines 161, 162, and 163 may be formed of a metal or an alloy having a low level of resistance, such as aluminum (Al), aluminum-neodymium (Al—Nd), copper (Cu), molybdenum (Mo), molybdenum-titanium (MoTi), and chromium (Cr).

The organic protective layer PAC on which the driving lines 161, 162, and 163 are formed is covered with an inorganic protective layer PAS.

The inorganic protective layer PAS may be formed of an inorganic material such as silicon nitride (SiNx) and silicon oxide (SiO$_2$).

In the first pixel 141, the touch electrode 130 is positioned on the inorganic protective layer PAS. The touch electrode 130 is electrically connected to the first driving line 161, positioned on a different layer, through a contact hole.

In the second pixel 142, the shield electrode 150 is positioned on the inorganic protective layer PAS. The shield electrode 150 is electrically connected to the second driving line 162, positioned on a different layer, through a contact hole.

In the gate lines or the gate electrodes as described above, gate metal layers or source/drain metal layers thereof may be formed of at least one metal material having a low resistance characteristic, such as aluminum (Al), aluminum alloys (AlNd), copper (Cu), copper alloys, molybdenum (Mo), molybdenum alloys (MoTi), and chromium (Cr).

In addition, each of the touch electrodes 130 and the shield electrode 150 may be a transparent electrode formed of a transparent conductive material having a relatively higher value of work function, for example, a metal oxide, such as indium tin oxide (ITO) or indium zinc oxide (IZO), or a combination of a metal and an oxide, such as ZnO:Al or SnO$_2$:Sb.

Furthermore, the gate insulating layer GI and the inorganic protective layer PAS may be formed of an inorganic insulating material, such as silicon oxide SiO$_2$ or silicon nitride SiNx, but these are not intended to be limiting. The gate insulating layer GI and the inorganic protective layer PAS may be formed of other electrically-insulating materials.

The first pixel 141 and the second pixel 142 may be formed in the same process. For example, transistors positioned in the first pixel 141 and transistors positioned in the second pixel 142 are formed in the same mask process. In addition, the touch electrodes 130 and the shield electrode 150 positioned in the first pixel 141 and the second pixel 142 are formed in the same mask process.

The touch electrodes 130 are spaced apart from each other at boundaries to be electrically isolated from each other. Here, portions of the shield electrode 150 formed in the same mask process may be spaced apart from each other.

Figure 3:
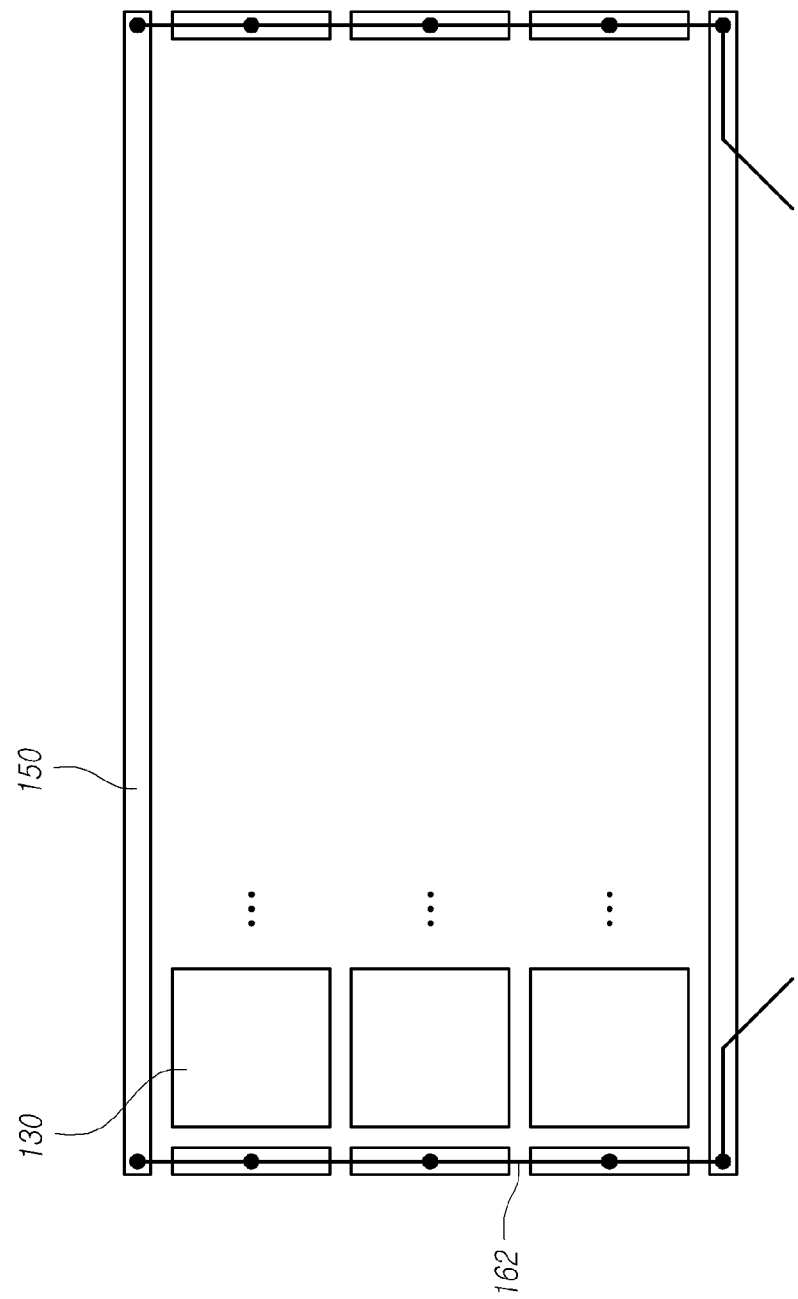
FIG. 3 illustrates a shield electrode, portions of which are spaced apart from each other.

FIG. 3 illustrates a shield electrode, portions of which are spaced apart from each other.

Referring to FIG. 3, the shield electrode 150 is a combination of a plurality of portions spaced apart from each other.

Gaps having predetermined widths are defined at the boundaries between the touch electrodes 130 such that the touch electrodes 130 are electrically isolated from each other. In the same manner, the portions of the shield electrode 150 may be spaced apart from each other by gaps.

The portions of the shield electrode 150 are spaced apart from each other in the longitudinal direction of the second driving line 162. In addition, the portions of the shield electrode 150 are electrically connected through the second driving line 162.

In the area of the shield electrode 150, the second pixels may be disposed adjacent to and spaced apart from each other. The second pixels spaced apart from each other may be electrically connected to each other through the second driving line 162.

The second driving line 162 is positioned on a different layer from the shield electrode 150, and is connected to the portions of the shield electrode 150, which are spaced apart from each other, through contact holes.

Although the portions of the shield electrode 150 are illustrated, in FIG. 3, as being spaced apart from each other, all common voltage electrodes of the second pixels may be connected to each other on the same layer such that the portions of the shield electrode 150 are not spaced apart from each other. In this case, the second driving line 162 may be connected to the shield electrode 150 through a single contact hole.

In addition, the display device may supply a signal to the shield electrode 150 through the second driving line 162 to prevent external noise from being introduced to the touch electrodes 130.

Figure 4:
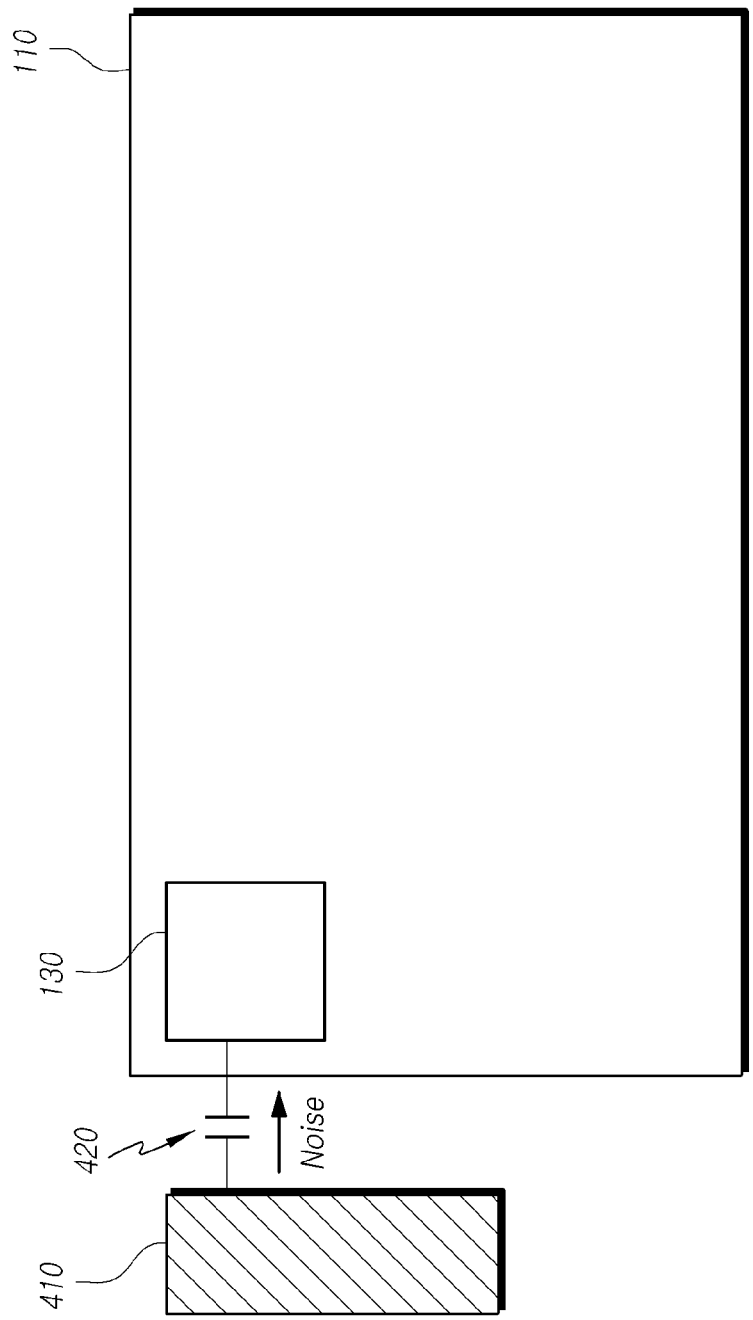
FIG. 4 illustrates the introduction of external noise to a touch electrode.

FIG. 4 illustrates how external noise can be introduced to a touch electrode.

Referring to FIG. 4, a noise source 410 is provided outside of the display panel 110.

The noise source 410 can form a capacitive coupling with the touch electrode 130. For example, the noise source 410 may be an object having an electrode or a human body. When the object or the human body is close enough to the touch electrode 130, a capacitive coupling is formed between the object or the human body and the touch electrode 130.

The noise source 410 can transfer noise to the touch electrode 130 using a coupling capacitor 420.

In the process in which the display device supplies a touch driving signal to the touch electrode 130 and then receives a response signal in response to the touch driving signal to detect a touch, the display device may erroneously recognize the noise as a touch.

When the noise source 410 does not transfer noise through the coupling capacitor 420, the formation of the coupling capacitor 420 increases the capacitance of the touch electrode 130, whereby the display device may erroneously detect a touch.

The display device detects a touch made to the touch electrode 130 by recognizing a change in the capacitance of the touch electrode 130. Thus, when the capacitance of the touch electrode 130 is increased by the noise source 410, the display device may erroneously recognize the increase in the capacitance as a touch made to the touch electrode 130.

Figure 5:
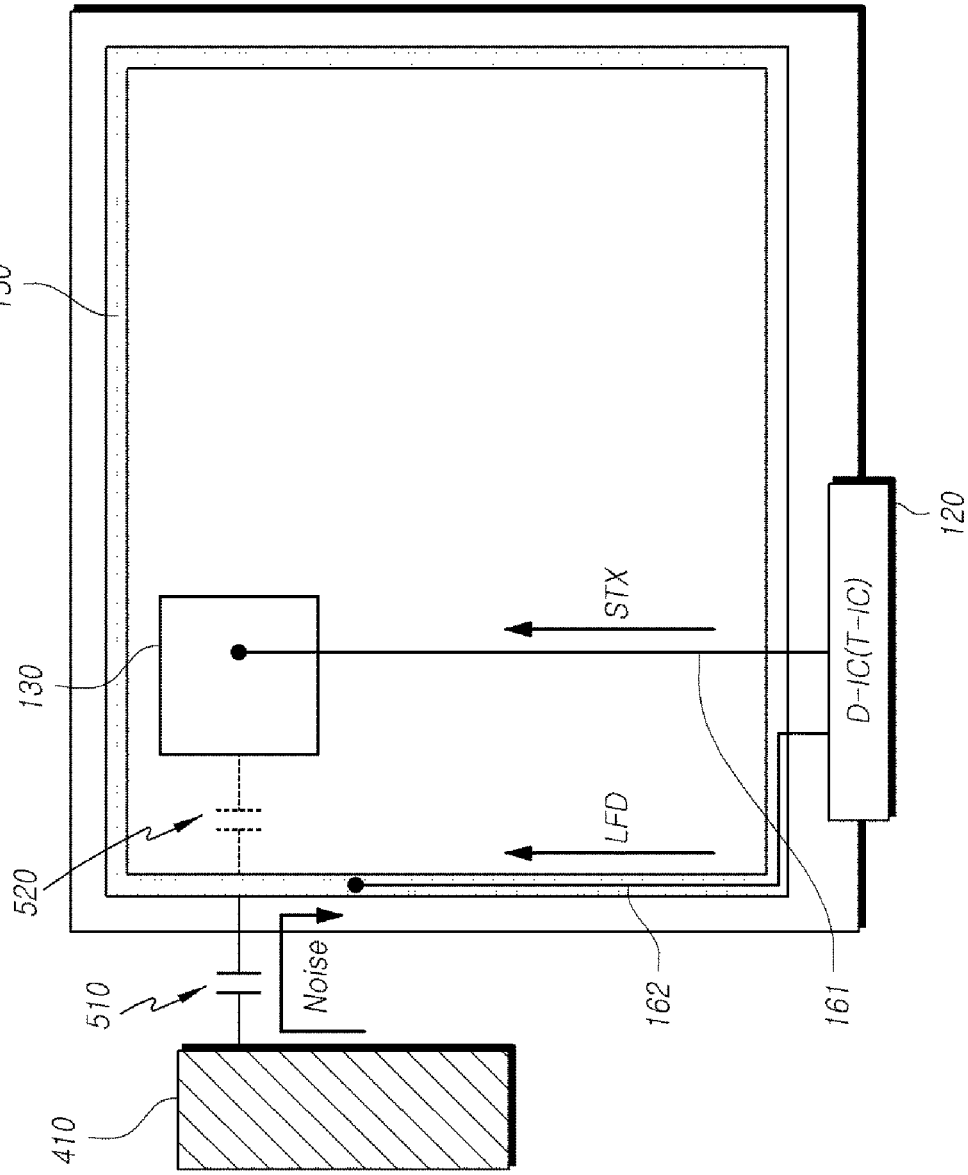
FIG. 5 illustrates a shield electrode blocking external noise.

FIG. 5 illustrates how a shield electrode blocks external noise.

Referring to FIG. 5, noise transferred from a noise source 410 and a first coupling capacitor 510 formed between the noise source 410 and the display device can be blocked by the shield electrode 150.

The shield electrode 150 surrounds an active area. The shield electrode 150 also surrounds the touch electrode 130 positioned in the active area.

The noise source 410 positioned outside of the display panel forms a capacitive coupling with the shield electrode 150, which is closer to the noise source 410 than the touch electrode 130 is. Thus, noise transferred from the noise source 410 leaks to the shield electrode 150 through the first coupling capacitor 510 formed between the noise source 410 and the shield electrode 150.

The shield electrode 150 can form a capacitive coupling with the touch electrode 130, and noise can be transferred through a second coupling capacitor 520 formed between the shield electrode 150 and the touch electrode 130. In addition, the second coupling capacitor 520 may increase the capacitance of the touch electrode 130.

The transfer of noise and the increase in capacitance due to the second coupling capacitor 520 can be removed using signals.

The touch electrode 130 is electrically connected to the driving circuit 120 through the first driving line 161, and the shield electrode 150 is electrically connected to the driving circuit 120 through the second driving line 162.

Here, the driving circuit 120 can supply a touch driving signal STX to the touch electrode 130 through the first driving line 161 while supplying a load-free driving signal LFD to the shield electrode 150 through the second driving line 162.

The phase of the touch driving signal STX and the phase of the load-free driving signal LFD may be synchronized with each other.

Figure 6:
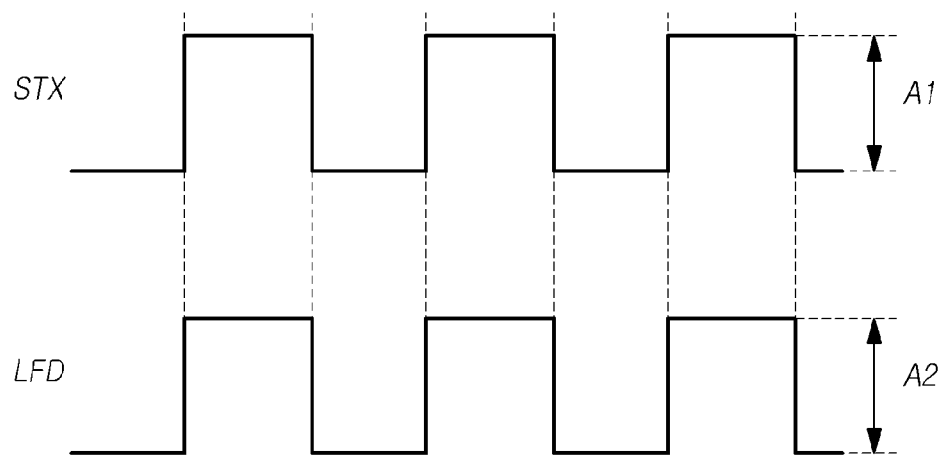
FIG. 6 illustrates a waveform of a signal supplied by the driving circuit illustrated in FIG. 5.

FIG. 6 illustrates a waveform of a signal supplied by the driving circuit illustrated in FIG. 5.

When signals having the same phase are applied to both ends of the capacitor, DC voltages are formed on both ends of the capacitor, and thus no current flows to the capacitor. This is the same as the case in which both ends of the capacitor are substantially insulated and thus a very high level of impedance is formed therebetween. In other words, substantially no capacitor is present.

Referring to both FIG. 5 and FIG. 6, the driving circuit inputs the touch driving signal STX and the load-free driving signal LFD, the phases of which are synchronized, to the touch electrode 130 and the shield electrode 150. Consequently, the synchronized signals are supplied to both ends of the second coupling capacitor 520 formed between the shield electrode 150 and the touch electrode 130, thereby achieving an effect as if the second coupling capacitor 520 is substantially removed. When not only the phases but also the sizes A1 and A2 of the touch driving signal STX and the load-free driving signal LFD are the same, the effect can be enhanced.

When the second coupling capacitor 520 formed between the shield electrode 150 and the touch electrode 130 is removed, noise generated by the noise source 410 is not transferred to the touch electrode 130, and the capacitance of the touch electrode 130 is not increased. This can consequently lower the possibility that the display device erroneously detects a touch due to the noise source 410.

The display device may have a double-folded shield film to block the noise source 410.

Figure 7:
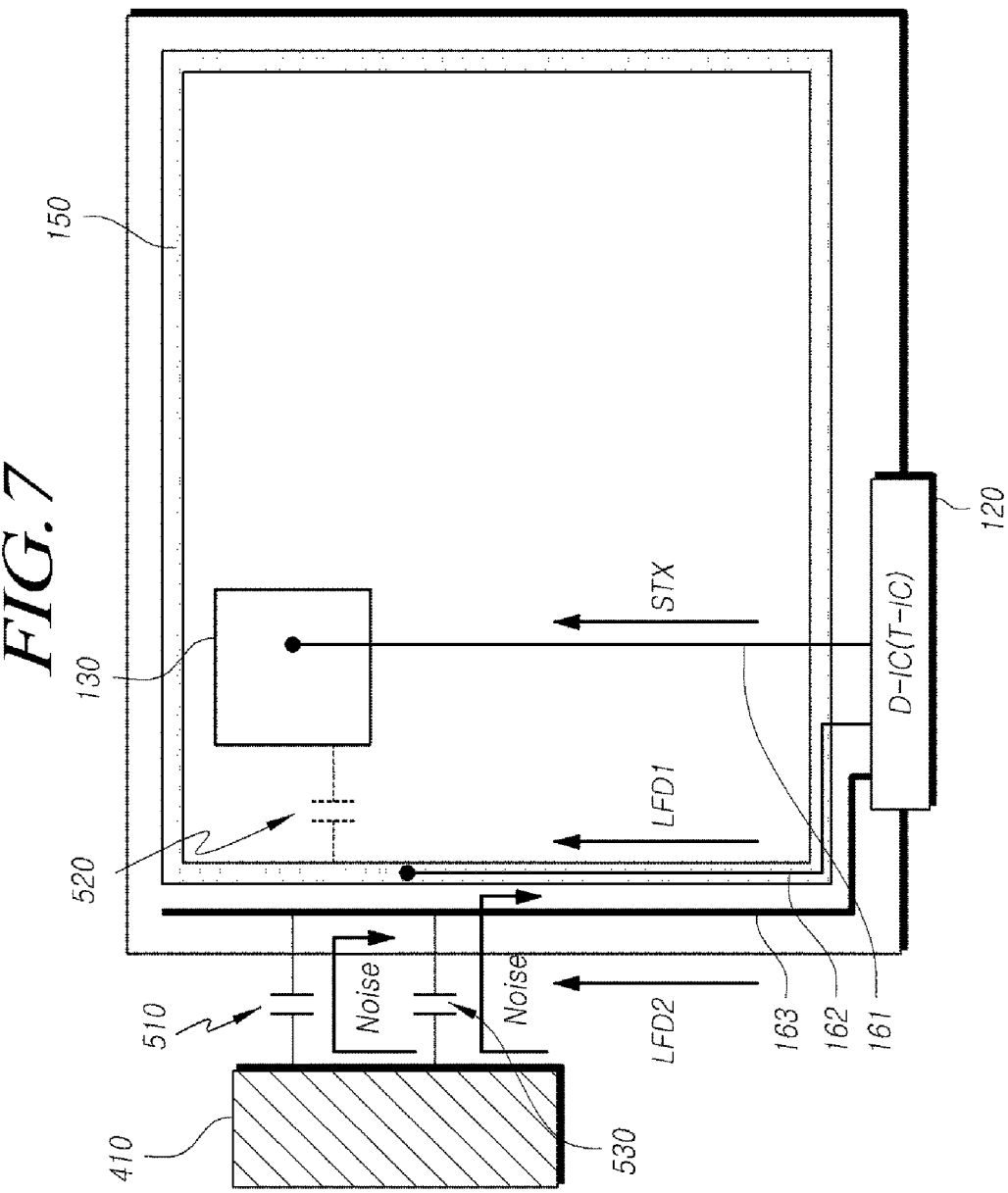
FIG. 7 illustrates a shield electrode and a shield metal layer blocking external noise.

FIG. 7 illustrates how a shield electrode and a shield metal layer block external noise.

Referring to FIG. 7, a shield metal layer can be formed as a third driving line 163 disposed on the same layer as the second driving line 162, outward of the shield electrode 150 on which the second pixels are positioned.

The noise source 410 can be coupled with the third driving line 163, positioned outward of the touch electrode 130 and the shield electrode, using a third coupling capacitor 530. The third coupling capacitor 530 functions as a first component to block external noise.

In addition, the first coupling capacitor 510 formed between the noise source 410 and the shield electrode 150 functions as a second element to block external noise.

Touch driving signals having synchronized phases can be supplied to the touch electrode 130, the shield electrode 150, and the third driving line 163 to remove coupling capacitors between the shield metal layer (the third driving line 163) and the touch electrode 130 and between the touch electrode 150 and the touch electrode 130.

Figure 8:
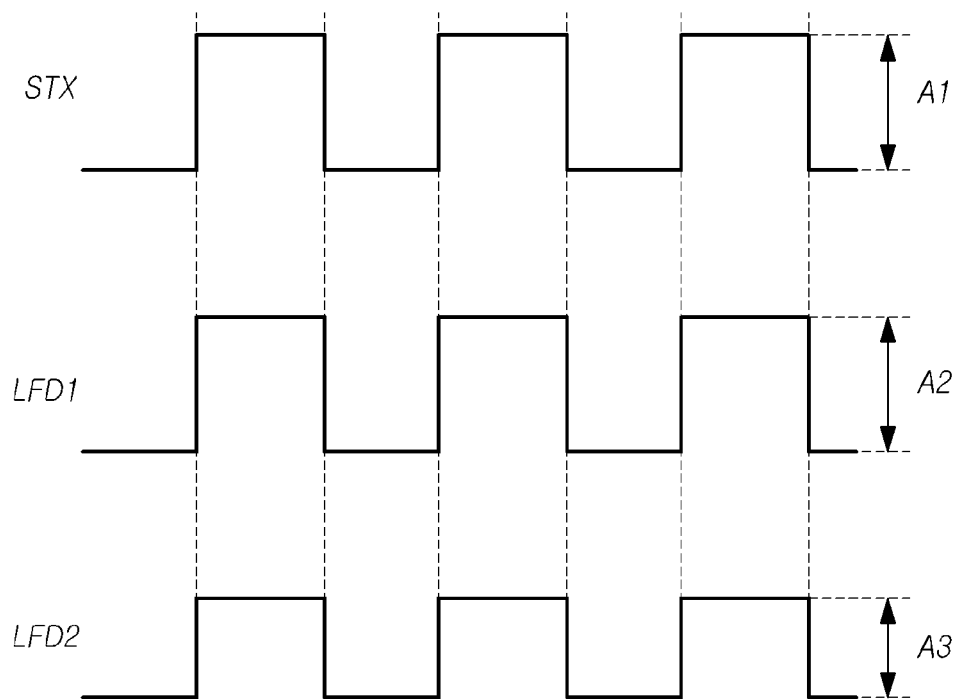
FIG. 8 illustrates a waveform of a signal supplied by the driving circuit illustrated in FIG. 7.

FIG. 8 illustrates a waveform of a signal supplied by the driving circuit illustrated in FIG. 7.

Referring to both FIG. 7 and FIG. 8, the driving circuit 120 can supply the touch driving signal STX to the touch electrode 130 while supplying the first load-free driving signal LFD1 to the shield electrode 150, the phase of the first load-free driving signal LFD1 being the same as that of the touch driving signal STX. The driving circuit 120 can supply the second load-free driving signal LFD2 to the third driving line 163, the phase of the second load-free driving signal LFD2 being the same as that of the touch driving signal STX.

These signals STX, LFD1, and LFD2 can remove all of the coupling capacitors among the touch electrode 120, the shield electrode 150, and the third driving line 163.

Although the signals are illustrated, in FIG. 8, as having the same phases and different sizes A1, A2, and A3, signals having the same phases and the same sizes may be supplied to the touch electrode 120, the shield electrode 150, and the third driving line 163. The driving circuit 120 can supply substantially the same touch driving signals STX to the first driving line 161, the second driving line 162, and the third driving line 163.

External noise may be transferred to the driving circuit 120 through the shield electrode 150 and the third driving line 163. The driving circuit 120 may not perform signal processing on such noise or may allow such noise to pass to the ground.

Specifically, the driving circuit 120 may receive a response signal only from the first driving line 161 in response to a touch driving signal and process the received response signal. Thus, a signal received from the second driving line 162 or the third driving line 163 may not be processed or may be allowed to pass to the ground.

According to the exemplary embodiments as set forth above, it is possible to overcome the problem in which the touch-integrated display device erroneously detects a touch. In addition, it is possible to reduce or prevent the introduction of noise to touch electrodes.

It will be understood that the terms "comprise," "include," "have," and any variations thereof used herein are intended to cover a non-exclusive inclusion unless explicitly described to the contrary. Unless otherwise defined, all terms including technical and scientific terms used herein have the same meaning as commonly understood by a person skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing descriptions and the accompanying drawings have been presented in order to explain the certain principles of the present disclosure. A person skilled in the art to which the disclosure relates could make many modifications and variations by combining, dividing, substituting for, or changing the elements without departing from the principle of the disclosure. The foregoing embodiments disclosed herein shall be interpreted as illustrative only but not as limitative of the principle and scope of the disclosure. It should be understood that the scope of the disclosure shall be defined by the appended Claims and all of their equivalents fall within the scope of the disclosure.

What is claimed is:

1. A touch-integrated display panel comprising:
    a substrate having an active area, that is visually recognizable by a user, and a non-active area, that is not visually recognizable by the user, outside the active area;
    a plurality of first and second pixels respectively comprising pixel electrodes and common voltage electrodes, the first pixels disposed in the active area and the second pixels disposed in the non-active area;
    a touch electrode comprising the common voltage electrodes of a first pixels group in the plurality of first pixels that are electrically connected; and
    a shield electrode comprising the common voltage electrodes of the plurality of second pixels that are electrically connected, the shield electrode surrounding the active area.

2. The touch-integrated display panel according to claim 1, further comprising:
    a touch driving circuit electrically connected to the touch electrode;
    at least one first driving line positioned on a different layer from the common voltage electrodes, the first driving line electrically connecting the touch driving circuit and the touch electrode;
    a second driving line electrically connecting the touch driving circuit and the shield electrode.

3. The touch-integrated display panel according to claim 2, further comprising a third driving line positioned outward of the plurality of second pixels and on the same layer as the second driving line, the third driving line electrically connected to the touch driving circuit.

4. The touch-integrated display panel according to claim 3, wherein the first, second and third driving lines receive signals having synchronized phases.

5. The touch-integrated display panel according to claim 4, wherein the first, second, and third driving lines receive the same touch driving signals.

6. The touch-integrated display panel according to claim 4, wherein the touch driving circuit receives a response signal only from the first driving line in response to the touch driving signals and processes the received response signal accordingly.

7. The touch-integrated display panel according to claim 2, wherein the second driving line electrically connects two adjacent and spaced apart second pixels to each other in the plurality of second pixels.

8. The touch-integrated display panel according to claim 3, wherein the first, second and third driving lines are formed of a material different from a data line of the display panel and disposed on layers different from the data line.

9. The touch-integrated display panel according to claim 3, wherein the first, second, and third drive lines are formed of the same material and disposed on the same layer on an organic protective layer.

10. The touch-integrated display panel according to claim 9, wherein the organic protective layer includes one of photo-acryl, acrylate, polyamide, and benzocyclobutene (BCB).

11. The touch-integrated display panel according to claim 3, wherein the first, second, and third driving lines includes one of aluminum, aluminum-neodymium, copper, molybdenum, molybdenum-titanium, and chromium.

12. A touch-integrated display device comprising:
    a display panel comprising a plurality of first pixels disposed in an active area, that is visually recognizable by a user, a plurality of second pixels disposed in a non-active area, that is not visually recognizable by the user, a touch electrode comprising common voltage electrodes of a first pixels group in the plurality of first pixels that are electrically connected, and a shield electrode comprising common voltage electrodes of the plurality of second pixels that are electrically connected, the shield electrode surrounding the active area; and
    a touch driving circuit supplying touch driving signals to the touch electrode and the shield electrode.

13. The touch-integrated display device according to claim 12, wherein the touch driving circuit supplies the touch driving signals having synchronized phases to the touch electrode and the shield electrode.

14. The touch-integrated display device according to claim 12, wherein the touch driving circuit receives a response signal only from the first driving line in response to the touch driving signals and processes the received response signal accordingly.

* * * * *